(12) United States Patent
Song et al.

(10) Patent No.: US 12,083,491 B2
(45) Date of Patent: Sep. 10, 2024

(54) FERROUS SULFIDE-CONTAINING PASSIVATOR FOR REMOVING HEAVY METAL FROM SOIL AND PREPARATION METHOD AND USE THEREOF

(71) Applicants: Henan University, Kaifeng (CN); Engineering Research Center for Nanomaterials Co., Ltd., Jiyuan (CN)

(72) Inventors: Chunpeng Song, Kaifeng (CN); Chaoran Li, Kaifeng (CN); Mingming Lian, Kaifeng (CN); Xiaohong Li, Kaifeng (CN); Zhijun Zhang, Kaifeng (CN)

(73) Assignees: HENAN UNIVERSITY, Kaifeng (CN); ENGINEERING RESEARCH CENTER FOR NANOMATERIALS CO., LTD., Jiyuan (CN)

( * ) Notice: Subject to any disclaimer, the term of this patent is extended or adjusted under 35 U.S.C. 154(b) by 204 days.

(21) Appl. No.: 17/891,170

(22) Filed: Aug. 19, 2022

(65) Prior Publication Data
US 2023/0068171 A1   Mar. 2, 2023

(30) Foreign Application Priority Data
Aug. 19, 2021  (CN) .......................... 202110953814.7

(51) Int. Cl.
*B01J 20/02* (2006.01)
*B01J 20/10* (2006.01)
(Continued)

(52) U.S. Cl.
CPC ....... *B01J 20/0229* (2013.01); *B01J 20/0266* (2013.01); *B01J 20/103* (2013.01);
(Continued)

(58) Field of Classification Search
CPC .. B01J 20/0229; B01J 20/0266; B01J 20/103; B01J 20/22; B01J 20/28007;
(Continued)

(56) References Cited

U.S. PATENT DOCUMENTS 1,902,203 A * 3/1933 Foord ................. C22B 34/1204
                                                        423/83
2,489,309 A * 11/1949 Cornelius ................ B01J 21/16
                                                        502/63

(Continued)

*Primary Examiner* — Edwin J Toledo-Duran
(74) *Attorney, Agent, or Firm* — MATTHIAS SCHOLL P.C.; Matthias Scholl

(57) ABSTRACT

A method for preparing the ferrous sulfide-containing passivator includes: dissolving a sulfide in an alkaline solution to form a mixed solution with a pH of 12-13; adding sodium silicate to the mixed solution and stirring for 0.5-1 hour at 20-40° C.; adding an aqueous solution of ferrous salt to the mixed solution containing sodium silicate, and allowing to react at 40-60° C. for 2-3 hours; where, with decrease of the pH of the mixed solution, sodium silicate is converted into silica nanoparticles, and the ferrous salt reacts with the sulfide to form ferrous sulfide; and further adding an aqueous solution of an organic modifier, and allowing to react at 40-60° C. for 1-2 hours to form a passivator slurry including surface-modified ferrous sulfide doped with silicon dioxide; filtering the passivator slurry to form a passivator.

11 Claims, 3 Drawing Sheets

(51) Int. Cl.
*B01J 20/22* (2006.01)
*B01J 20/28* (2006.01)
*B01J 20/30* (2006.01)
*B09C 1/08* (2006.01)
*C09K 17/02* (2006.01)

(52) U.S. Cl.
CPC ......... *B01J 20/22* (2013.01); *B01J 20/28007* (2013.01); *B01J 20/3085* (2013.01); *B09C 1/08* (2013.01); *C09K 17/02* (2013.01); *B09C 2101/00* (2013.01)

(58) Field of Classification Search
CPC .... B01J 20/3085; B09C 1/08; B09C 2101/00; C09K 17/02; C09K 17/40
See application file for complete search history.

(56) References Cited

U.S. PATENT DOCUMENTS

| | | | | |
|---|---|---|---|---|
| 2,489,332 A * | 11/1949 | Shabaker | B01J 21/16 | 502/81 |
| 2,550,416 A * | 4/1951 | Kimberlin, Jr. | B01J 23/78 | 518/715 |
| 2,682,092 A * | 6/1954 | Henricks | B22C 1/18 | 264/117 |
| 2,719,082 A * | 9/1955 | Paul | C22B 3/08 | 75/754 |
| 2,897,159 A * | 7/1959 | Michalko | C22C 9/00 | 502/8 |
| 3,211,519 A * | 10/1965 | Roberts | C01D 7/14 | 423/184 |
| 3,596,034 A * | 7/1971 | Mekjean | F24H 7/0433 | 219/628 |
| 3,616,041 A * | 10/1971 | Kehr | C09J 123/16 | 156/310 |
| 3,640,923 A * | 2/1972 | Guthrie | C08G 75/045 | 522/158 |
| 3,650,802 A * | 3/1972 | Kehr | C08G 75/045 | 427/302 |
| 3,718,559 A * | 2/1973 | Wallace | B01J 20/06 | 204/542 |
| 3,847,788 A * | 11/1974 | Wallace | B01D 61/46 | 204/633 |
| 3,924,520 A * | 12/1975 | Boardman | G03C 1/733 | 430/920 |
| 3,975,265 A * | 8/1976 | Petrovich | B03D 1/06 | 209/166 |
| 3,976,566 A * | 8/1976 | Petrovich | B03D 1/06 | 209/166 |
| 4,132,780 A * | 1/1979 | McConnell | A01N 25/32 | 424/673 |
| 4,169,811 A * | 10/1979 | Yoshikawa | C09B 67/0092 | 436/904 |
| 4,299,613 A * | 11/1981 | Cardarelli | A01N 47/22 | 71/64.11 |
| 4,380,685 A * | 4/1983 | Chu | C07C 6/123 | 585/475 |
| 4,472,518 A * | 9/1984 | Chu | C07C 2/66 | 502/77 |
| 4,478,803 A * | 10/1984 | Zambrano | B01D 53/508 | 423/539 |
| 4,566,986 A * | 1/1986 | Waldmann | C01B 33/20 | 252/175 |
| 5,374,599 A * | 12/1994 | Ishii | B01J 23/755 | 502/330 |
| 5,399,541 A * | 3/1995 | Ishii | C02F 1/725 | 502/262 |
| 5,421,897 A * | 6/1995 | Grawe | B08B 7/0014 | 134/6 |
| 5,620,610 A * | 4/1997 | Ishii | B01J 23/83 | 210/762 |
| 5,711,922 A * | 1/1998 | O'Brien | C22B 19/22 | 423/106 |
| 5,856,055 A * | 1/1999 | Ugai | G03G 9/091 | 430/108.4 |
| 5,976,752 A * | 11/1999 | Matsunaga | G03G 9/087 | 430/108.23 |
| 8,697,594 B2 * | 4/2014 | Nguyen | B01J 23/85 | 502/223 |
| 9,526,692 B2 * | 12/2016 | Rehage | C10G 1/047 | |
| 2003/0153457 A1 * | 8/2003 | Nemoto | B01J 20/3236 | 96/108 |
| 2007/0022541 A1 * | 2/2007 | Taeger | C14C 1/065 | 8/94.16 |
| 2008/0017552 A1 * | 1/2008 | Wright | B03D 1/01 | 210/705 |
| 2008/0029460 A1 * | 2/2008 | Wright | B03D 1/016 | 210/705 |
| 2008/0251081 A1 * | 10/2008 | Claussen | A41D 13/1192 | 128/205.27 |
| 2010/0304096 A2 * | 12/2010 | Tynan, Jr. | B32B 7/12 | 428/192 |
| 2011/0017677 A1 * | 1/2011 | Evans | C02F 1/5236 | 210/708 |
| 2011/0120914 A1 * | 5/2011 | Kuperman | C10G 1/086 | 208/403 |
| 2011/0120915 A1 * | 5/2011 | Kuperman | C10G 1/086 | 208/403 |
| 2011/0120916 A1 * | 5/2011 | Kuperman | C10G 1/086 | 208/403 |
| 2011/0120917 A1 * | 5/2011 | Kuperman | C10G 1/086 | 208/403 |
| 2011/0120918 A1 * | 5/2011 | Kuperman | C10G 1/086 | 208/423 |
| 2011/0124493 A1 * | 5/2011 | Kuperman | B01J 27/049 | 502/167 |
| 2011/0124494 A1 * | 5/2011 | Mironov | B01J 27/049 | 502/167 |
| 2011/0124496 A1 * | 5/2011 | Mironov | B01J 37/20 | 502/200 |
| 2011/0124498 A1 * | 5/2011 | Kuperman | B01J 37/20 | 502/216 |
| 2011/0203583 A1 * | 8/2011 | Cozean | A61M 16/0093 | 128/203.12 |
| 2011/0203585 A1 * | 8/2011 | Cozean | A61M 16/0093 | 128/203.12 |
| 2012/0168364 A1 * | 7/2012 | Evans | C02F 1/5236 | 210/202 |
| 2012/0192740 A1 * | 8/2012 | Miyazaki | B41N 3/08 | 101/463.1 |
| 2013/0344310 A1 * | 12/2013 | Wasserfallen | C09D 5/088 | 427/372.2 |
| 2014/0271928 A1 * | 9/2014 | Rehage | A61K 8/34 | 424/680 |
| 2014/0374314 A1 * | 12/2014 | Sundararaman | C10G 9/005 | 208/78 |
| 2015/0014216 A1 * | 1/2015 | Sundararaman | C10G 45/16 | 208/49 |
| 2016/0207817 A1 * | 7/2016 | Hojaji | C08K 7/28 | |
| 2017/0283334 A1 * | 10/2017 | Rohrer | C05F 11/00 | |
| 2018/0215627 A1 * | 8/2018 | Kinoshita | C01F 5/00 | |
| 2018/0245179 A1 * | 8/2018 | Graell Moore | C22B 3/12 | |
| 2018/0272396 A1 * | 9/2018 | Farmer | A01N 63/22 | |
| 2019/0210339 A1 * | 7/2019 | Kuwajima | B32B 25/08 | |
| 2019/0270067 A1 * | 9/2019 | Wang | B01J 20/3078 | |
| 2020/0036002 A1 * | 1/2020 | Chakraborty | H01M 10/48 | |
| 2020/0188884 A1 * | 6/2020 | Osman | B01J 21/08 | |
| 2020/0188889 A1 * | 6/2020 | Osman | C01G 53/40 | |
| 2020/0231612 A1 * | 7/2020 | Nagata | C07F 9/08 | |
| 2021/0028452 A1 * | 1/2021 | Su | H01M 4/623 | |
| 2021/0028457 A1 * | 1/2021 | Newhouse | H01M 4/661 | |
| 2021/0213712 A1 * | 7/2021 | Kuwajima | B32B 1/08 | |
| 2021/0261427 A1 * | 8/2021 | Novek | C01C 1/026 | |
| 2021/0261489 A1 * | 8/2021 | Novek | C01F 11/06 | |

* cited by examiner

FERROUS SULFIDE-CONTAINING PASSIVATOR FOR REMOVING HEAVY METAL FROM SOIL AND PREPARATION METHOD AND USE THEREOF

CROSS-REFERENCE TO RELATED APPLICATIONS

Pursuant to 35 U.S.C. § 119 and the Paris Convention Treaty, this application claims foreign priority to Chinese Patent Application No. 202110953814.7 filed Aug. 19. 2021, the contents of which, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, Mass. 02142.

BACKGROUND

The disclosure relates to the removal of heavy metals from contaminated soil, and more particularly to a ferrous sulfide-containing passivator for removing a heavy metal from soil and preparation method and use thereof.

Heavy metals are present in the environment due to metal smelting, pesticide production, and industrial wastewater discharge, and are poisonous to all kinds of organisms. Researchers attempt to develop a method for improvement of heavy-metal-contaminated soil.

Ferrous sulfide is a potential passivator used for selectively removing certain types of heavy metals from contaminated soil. However, ferrous sulfide tends to be oxidized and has poor storage stability, which results in high rates of chemical accidents.

SUMMARY

The disclosure provides a ferrous sulfide-containing passivator for removing a heavy metal from contaminated soil. A sulfide and sodium silicate are dissolved in alkaline water, forming a metal sulfide; an acidic aqueous solution of ferrous salt is added to the metal sulfide to produce silica nanoparticles; simultaneously, the ferrous salt reacts with the metal sulfide to produce ferrous sulfide; and the silica nanoparticles are bond to the ferrous sulfide to form ferrous sulfide doped with silicon dioxide. In this process, ferrous sulfide avoids contact with oxygen and is wrapped in a layer of organic matter, thus ensuring the stability of the passivator.

The disclosure provides a method for preparing the ferrous sulfide-containing passivator, and the method comprising:

1) dissolving a sulfide in an alkaline solution to form a mixed solution with a pH of 12-13;

2) adding sodium silicate to the mixed solution and stirring for 0.5-1 hour at 20-40° C.;

3) adding an aqueous solution of ferrous salt to the mixed solution containing sodium silicate, and allowing to react at 40-60° C. for 2-3 hours; where, with decrease of the pH of the mixed solution, sodium silicate is converted into silica nanoparticles, and the ferrous salt reacts with the sulfide to form ferrous sulfide; and 4) further adding an aqueous solution of an organic modifier, and allowing to react at 40-60° C. for 1-2 hours to form a passivator slurry comprising surface-modified ferrous sulfide doped with silicon dioxide; filtering the passivator slurry through suction filtration to form a filter cake passivator or spray drying the passivator slurry to form a dry powdery passivator.

In a class of this embodiment, in 1), the sulfide is sodium hydrosulfide, sodium sulfide, potassium sulfide, ammonium sulfide, or a mixture thereof, and preferably ammonium sulfide or sodium hydrosulfide.

In a class of this embodiment, a molar ratio of the sulfide to the ferrous salt is between 0.85:1 and 1.00:1; sodium silicate is quantified by silicon dioxide, and a mass ratio of silicon dioxide to ferrous sulfide is between 1:1 and 1:2; and a molar ratio of the organic modifier to the ferrous salt is between 0.05:1 and 0.15:1; and a mass concentration of silicon dioxide in an aqueous solution of sodium silicate is 10%-30%.

In a class of this embodiment, in 3), the ferrous salt is a soluble salt such as ferrous sulfate and/or ferrous chloride, preferably ferrous sulfate.

In a class of this embodiment, in 4), the organic modifier is at least one of sodium humate, potassium humate, and dialkyl dithiocarbamic acid comprising 1 to 10 carbon atoms or a salt thereof, preferably sodium humate or sodium dialkyldithiocarbamate. The removal of certain metals, particularly cadmium (Cd), varies depending on the type of the organic modifier used.

In a class of this embodiment, in 1), the alkaline solution is a 1-5 mol/L aqueous solution of sodium hydroxide or potassium hydroxide.

The disclosure further comprises a method for improvement of heavy-metal-contaminated soil, the method comprising adding the passivator to the soil, and the method comprising:

1%-4% by weight of the passivator is added to the heavy-metal-contaminated soil and mixed using a rotary tiller.

Specifically, 1%, 2%, 3%, and 4% by weight of the passivator are added to the soil, that is, 14 kg/m$^3$, 28 kg/m$^3$, 42 kg/m$^3$, and 56 kg/m$^3$ of the passivators are respectively added to the soil having a bulk density of 1.4 g/cm$^3$.

The passivator of the disclosure achieves high removal of heavy metals from the contaminated soil. The preparation method of the passivator is simple, low cost, and mass-produced. The passivator is easy to apply, pleiotropic, resistant to oxidation, used as a silica fertilizer, and is thought to have numerous applications.

1. The passivator is directly added to the contaminated soil to perform a pleiotropic role in the removal of multiple heavy metals such as copper (Cu), lead (Pb), cadmium (Cd), and arsenic (As); and the silica nanoparticles cause the plants to absorb more silica than usual.

2. Because of their high specific surface area, large pore volume, and high activity, the silica nanoparticles increase the level of available silicon in the contaminated soil and thus improves the physical and chemical properties of the soil.

3. The modifier and silicon dioxide improve the stability of ferrous sulfide, thus ensuring safe use and storage of the passivator.

DETAILED DESCRIPTION

Figure 1:
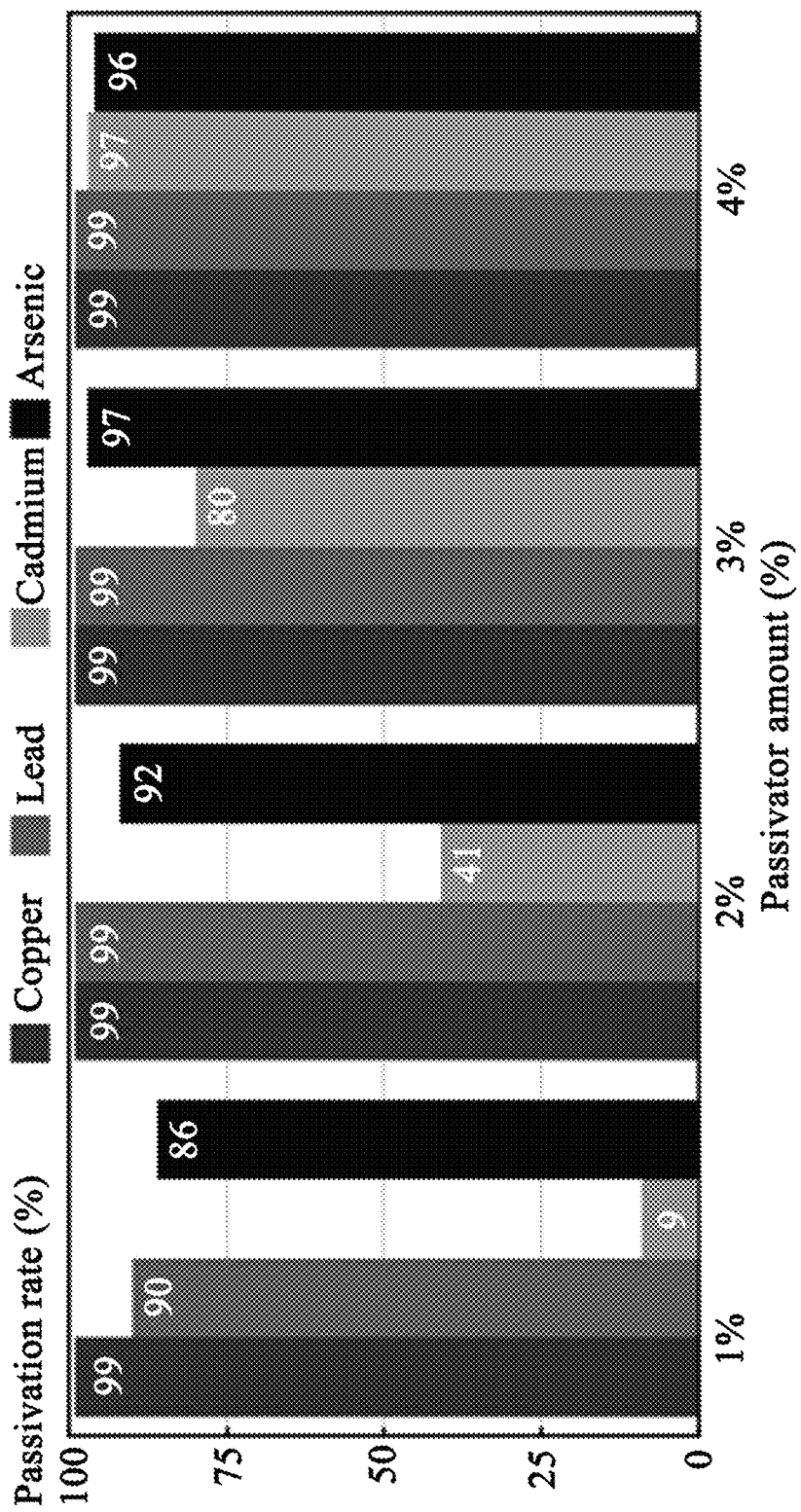
FIG. 1 is a graph demonstrating a decrease of heavy metals in an extract of soil treated by a passivator in accordance with Example 2 of the disclosure.

According to the technical specification for soil environmental monitoring (HJ/T166-2004) issued by the Ministry of Environmental Protection of China, the DTPA (diethylenetriaminepentaacetic acid) micronutrient extraction method was used to extract available Pb, Cd, and Cu from soil, the $NaHCO_3$ extraction method was used to extract available As from soil, and the inductively coupled plasma optical emission spectrometer (ICP-OES) was used to determine the levels of heavy metals in a soil extract.

In the following examples, contaminated soil was collected around local smelters in Jiyuan City.

TABLE 1

Levels of copper (Cu), lead (Pb), cadmium (Cd), and arsenic (As) in the contaminated soil

| Element | Levels of available metal |
|---|---|
| Cu | 47.7-56.4 mg/kg |
| Pb | 1383.2-1442.8 mg/kg |
| Cd | 11.6-14.5 mg/kg |
| As | 6.5-7.5 mg/kg |

Example 1

A method for preparing a passivator comprises:
1) 34.3 g of (0.306 mol) potassium sulfide (purity 98.0%) was added in a 1000 mL three-necked flask; 4.0 g of potassium hydroxide was dissolved in 50 mL of deionized water, added to the three-necked flask, stirred evenly (to achieve a pH of 12-13), and heated to 40° C.;
2) 53.2 g of sodium (containing 28.22% silicon dioxide) was dispersed in 100 mL of deionized water, slowly added in the three-necked flask with stirring at 40° C., and allowed to react at 40° C. for 0.5 hours;
3) 43.1 g (0.340 mol) of ferrous chloride (purity 99%) was dissolved in 200 mL of deionized water, slowly added drop-wise in the three-necked flask with stirring at 40° C., and allowed to react at 40° C. for 2 hours; and
4) 5.9 g of (0.034 mol) sodium diethyldithiocarbamate (purity 99%) was dissolved in 100 mL of deionized water, slowly added drop-wise in the three-necked flask with stirring at 60° C., and allowed to react at 60° C. for 1 hour to form a passivator slurry (comprising surface-modified ferrous sulfide doped with silicon dioxide); and the passivator slurry was filtered under suction to form a filter cake as a passivator.

In the example, 2.0% by weight of the passivator was added to the soil (that is, 28 kg/m passivator was added to the soil having a bulk density of 1.4 g/cm). According to the technical specifications for soil environmental monitoring (HJ/T166-2004) issued by the Ministry of Environmental Protection of China, the DTPA (diethylenetriaminepentaacetic acid) micronutrient extraction method was used to extract available Pb, Cd, and Cu from soil, and the inductively coupled plasma optical emission spectrometer (ICP-OES) was used to determine the levels of heavy metals in the soil extract. The levels of the available Cu, Pb, and Cd in the soil extract decreased from 49.1 mg/L, 1403.8 mg/L, 12.7 mg/L to 0.44 mg/L, 7.87 mg/L, and 10.21 mg/L, respectively, resulting in passivation rates of 99%, 99% and 17%; the results revealed that the levels of the available Cu and Pb in the soil extract decreased significantly.

Example 2

A method for preparing a passivator comprises:
1) 122.4 g of (0.306mol) ammonium sulfide (purity 17%) was added in a 1000 mL three-necked flask; 4.0 g of potassium hydroxide was dissolved in 50 mL of deionized water, added to the three-necked flask, stirred evenly (to achieve a pH of 12-13), and heated to 40° C.;
2) 53.2 g of sodium silicate (containing 28.22% silicon dioxide) was dispersed in 100 mL of deionized water, slowly added in the three-necked flask with stirring at 40° C., and allowed to react at 40° C. for 0.5 hours;
3) 95.5 g (0.340 mol) of ferrous sulfate heptahydrate (purity 99%) was dissolved in 200 mL of deionized water, slowly added drop-wise in the three-necked flask with stirring at 40° C., and allowed to react at 40° C. for 2 hours; and
4) 12.2 g of (0.034 mol) sodium dimethyldithiocarbamate (purity 40%) was dissolved in 100 mL of deionized water, slowly added drop-wise in the three-necked flask with stirring at 60° C., allowed to react at 60° C. for 1 hour, and underwent spray drying to form dry powders as a passivator.

In the example, 1.0%, 2.0%, 3.0%, and 4.0% by weight of the passivator was added to the soil. According to the technical specifications (HJ/T166-2004) for soil environmental monitoring issued by the Ministry of Environmental Protection of China, the DTPA (diethylenetriaminepentaacetic acid) micronutrient extraction method was used to extract available Pb, Cd, and Cu from soil, 0.05 mol/L $NaHCO_3$ was used to extract available As from soil, and the inductively coupled plasma optical emission spectrometer (ICP-OES) was used to determine the levels of heavy metals in the soil extract. As shown in FIG. 1:

when 1.0% by weight of the passivator was added to the soil, the passivation rates for Cu, Pb, and As were 99%, 90% and 86%, respectively;

when 2.0% by weight of the passivator was added to the soil, the passivation rate for Pb was 92%;

when 3.0% by weight of the passivator was added to the soil, the passivation rates for As and Cd were 97% and 80%, respectively; and when 4.0% by weight of the passivator was added to the soil, the passivation rate for Cd was 97%.

Example 3

A method for preparing a passivator comprises:
1) 64.8 g of (0.162 mol) ammonium sulfide (purity 17%) was added in a 1000 mL three-necked flask; 1.5 g of sodium hydroxide was dissolved in 30 mL of deionized water, added to the three-necked flask, stirred evenly (to achieve a pH of 12-13);
2) 26.2 g of sodium silicate (containing 28.22% silicon dioxide) was dispersed in 50 mL of deionized water, slowly added in the three-necked flask with stirring at 40° C., and allowed to react at 40° C. for 0.5 hours;
3) 47.7 g (0.170 mol) of ferrous sulfate heptahydrate (purity 99%) was dissolved in 150 mL of deionized water, slowly added in the three-necked flask with stirring at 40° C., and allowed to react at 40° C. for 2 hours; and
4) 3.1 g of (0.009 mol) sodium dimethyldithiocarbamate (purity 40%) was dissolved in 50 mL of deionized water, slowly added in the three-necked flask with stirring at 60°

C., allowed to react at 60° C. for 1 hour, and underwent spray drying to form dry powders as a passivator.

When 4.0% by weight of the passivator was added to the soil, the passivation rates for Cu, Pb, Cd, and As were 99%, 99%, 73% and 99%, respectively.

Example 4

A method for preparing a passivator comprises:

1) 64.8g of (0.162 mol) ammonium sulfide (purity 17%) was added in a 1000 mL three-necked flask; 2.0 g of potassium hydroxide was dissolved in 30 mL of deionized water, added to the three-necked flask, stirred evenly (to achieve a pH of 12-13), and heated to 40° C.

2) 53.2 g of sodium silicate (containing 28.22% silicon dioxide) was dispersed in 100 mL of deionized water, slowly added in the three-necked flask with stirring at 40° C., and allowed to react at 40° C. for 0.5 hours;

3) 47.7 g (0.170 mol) of ferrous sulfate heptahydrate (purity 99%) was dissolved in 200 mL of deionized water, slowly added drop-wise in the three-necked flask with stirring at 40° C., and allowed to react at 40° C. for 2 hours; and 4) 3 g of (0.034 mol) potassium humate (purity 99%) was dissolved in 50 mL of deionized water, slowly added drop-wise in the three-necked flask with stirring at 60° C., allowed to react at 60° C. for 1 hour, filtered under suction to form a filter cake as a passivator.

When 4.0% by weight of the passivator was added to the soil, the passivation rates for Cu, Pb, Cd, and As were 99%, 99%, 41% and 99%, respectively. In this example, excess silicon dioxide was added, resulting in a reduced removal rate of Cd.

Example 5

A method for preparing a passivator comprises:

1) 22.6 g of (0.289 mol) sodium hydrosulfide (purity 71.5%) was added in a 1000 mL three-necked flask; 12 g of potassium hydroxide was dissolved in 100 mL of deionized water, added to the three-necked flask, stirred evenly (to achieve a pH of 12-13);

2) 53.2 g of sodium silicate (containing 28.22% silicon dioxide) was dispersed in 100 mL of deionized water, slowly added in the three-necked flask with stirring at 20° C., and allowed to react at 40° C. for 1 hour;

3) 95.5 g (0.340 mol) of ferrous sulfate heptahydrate (purity 99%) was dissolved in 200 mL of deionized water, slowly added in the three-necked flask with stirring at 40° C., and allowed to react at 40° C. for 3 hours; and 4) 18.2 g of (0.051 mol) sodium dimethyldithiocarbamate (purity 40%) was dissolved in 100 mL of deionized water, slowly added in the three-necked flask with stirring at 60° C., allowed to react at 60° C. for 2 hours, and underwent spray drying to form dry powders as a passivator.

When 4.0% by weight of the passivator was added to the soil, the passivation rates for Cu, Pb, Cd, and As were 99%, 99%, 95% and 98%, respectively.

Example 6

A method for preparing a passivator comprises:

1) 13.3 g of (0.162 mol) sodium sulfide (purity 95.0%) was added in a 1000 mL three-necked flask; 4.0 g of potassium hydroxide was dissolved in 30 mL of deionized water, added to the three-necked flask, stirred evenly (to achieve a pH of 12-13);

2) 53.2 g of sodium silicate (containing 28.22% silicon dioxide) was dispersed in 100 mL of deionized water, slowly added in the three-necked flask with stirring at 20° C., and allowed to react at 40° C. for 1 hour;

3) 47.7 g (0.170 mol) of ferrous sulfate heptahydrate (purity 99%) was dissolved in 200 mL of deionized water, slowly added in the three-necked flask with stirring at 40° C., and allowed to react at 40° C. for 3 hours; and 4) 3 g of potassium humate was dissolved in 100 mL of deionized water, slowly added in the three-necked flask with stirring at 60° C., allowed to react at 60° C. for 2 hours, and underwent spray drying to form dry powders as a passivator.

When 4.0% by weight of the passivator was added to the soil, the passivation rates for Cu, Pb, Cd, and As were 99%, 99%, 56% and 94%, respectively.

Example 7

A method for preparing a passivator comprises:

1) 24.0 g of (0.306 mol) sodium hydrosulfide (purity 71.5%) was added in a 1000 mL three-necked flask; 16 g of potassium hydroxide was dissolved in 100 mL of deionized water, added to the three-necked flask, stirred evenly (to achieve a pH of 12-13);

2) 53.2 g of sodium silicate (containing 28.22% silicon dioxide) was dispersed in 100 mL of deionized water, slowly added in the three-necked flask with stirring at 20° C., and allowed to react at 40° C. for 1 hour;

3) 95.5 g (0.340 mol) of ferrous sulfate heptahydrate (purity 99%) was dissolved in 200 mL of deionized water, slowly added in the three-necked flask with stirring at 40° C., and allowed to react at 40° C. for 3 hours; and 4) 6 g of potassium humate was dissolved in 100 mL of deionized water, slowly added in the three-necked flask with stirring at 60° C., allowed to react at 60° C. for 2 hours, and underwent spray drying to form dry powders as a passivator.

Figure 2:
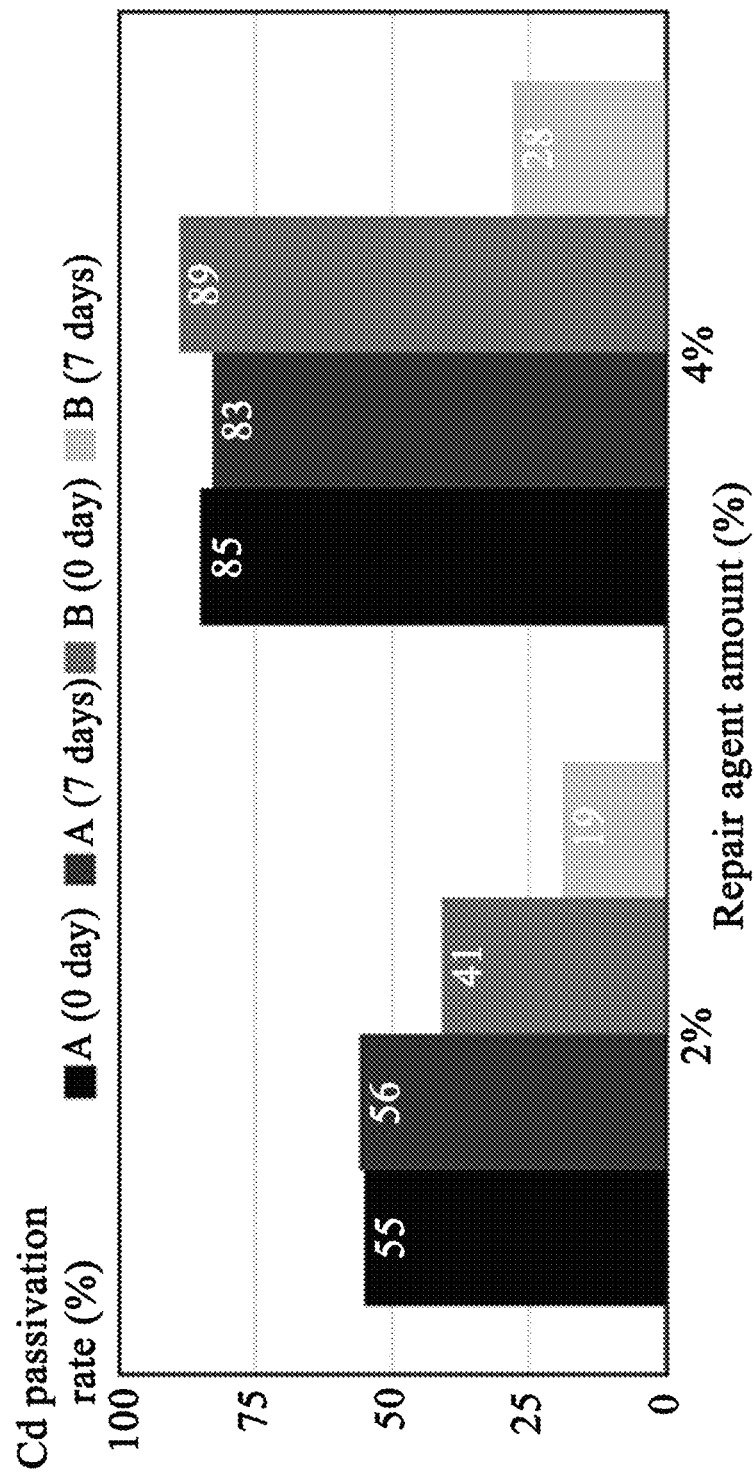
FIG. 2 is a graph demonstrating an oxidation resistance of a passivator in accordance with Example 7 of the disclosure.

Experiments were carried out to determine the oxidation resistance of the disclosed and a conventional passivator containing no sodium silicate. The two passivators were stored at room temperature for 0 and 7 days, respectively. 2.0% and 4.0% by weight of the two passivators were added to the contaminated soil; and the passivation rate for Cu, Pb, and Cd in soil extracts were measured and compared. The experimental results revealed no statistically significant differences in the passivation rates for available Cu and Pb in control and experimental groups. The passivation rates for Cd in the soil extracts were shown in FIG. 2, where group A was treated with the passivator of the disclosure and group B was treated with the passivator containing no sodium silicate. In the group A, the passivator remained black after storage at room temperature for 7 days, resulting in no significant changes in the passivation rates for Cd. In the group B, 2% and 4% by weight of the passivator was oxidized after storage at room temperature for 7 days and changed to yellow-brown from black; the passivation rates for the available Cd in the soil extract decreased from 41% and 89% to 19% and 28%, respectively, decreasing by 22% and 61%. The experimental results revealed that the silica nanoparticles improved the oxidation resistance of the disclosure.

Example 8

Figure 3:
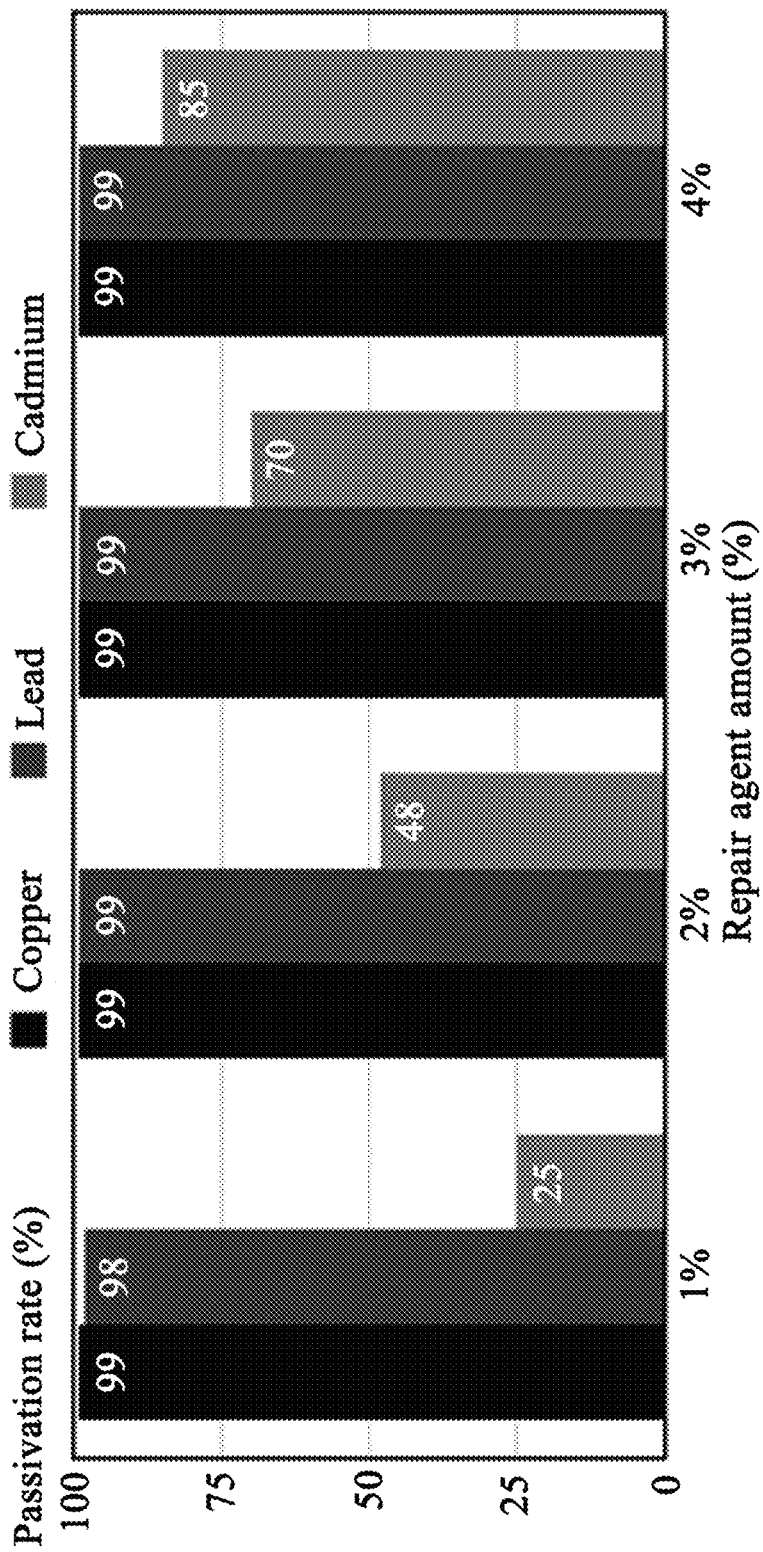
FIG. 3 is a graph demonstrating a decrease of heavy metals in an extract of soil treated by a passivator in accordance with Example 8 of the disclosure.

A method for preparing a passivator comprises:

1) 13.3 g of (0.170 mol) sodium hydrosulfide (purity 71.5%) was added in a 1000 mL three-necked flask; 8 g of potassium hydroxide was dissolved in 70 mL of deionized water, added to the three-necked flask, stirred evenly (to achieve a pH of 12-13);

2) 26.2 g of sodium silicate (containing 28.22% silicon dioxide) was dispersed in 50 mL of deionized water, slowly added in the three-necked flask with stirring at 20° C., and allowed to react at 20° C. for 1 hour;

3) 47.7 g (0.170 mol) of Ferrous sulfate heptahydrate (purity 99%) was dissolved in 150 mL of deionized water, slowly added in the three-necked flask with stirring at 40° C., and allowed to react at 40° C. for 3 hours; and 4) 3 g of sodium humate was dissolved in 50 mL of deionized water, slowly added in the three-necked flask with stirring at 40° C., allowed to react at 40° C. for 2 hours, and underwent spray drying to form dry powders as a passivator. As shown in FIG. 3:

when 1.0% by weight of the passivator was added to the soil, the passivation rates for Cd and Pb were 99% and 98%, respectively;

when 2.0% by weight of the passivator was added to the soil, the passivation rates for Pb and Cd were 99% and 48%, respectively;

when 3.0% by weight of the passivator was added to the soil, the passivation rate for Cd was 70%, respectively; and when 4.0% by weight of the passivator was added to the soil, the passivation rate for Cd was 85%.

It will be obvious to those skilled in the art that changes and modifications may be made, and therefore, the aim in the appended claims is to cover all such changes and modifications.

What is claimed is:

1. A method, comprising:
   1) dissolving a sulfide in an alkaline solution to form a mixed solution with a pH of 12-13;
   2) adding sodium silicate to the mixed solution and stirring for 0.5-1 hour at 20-40° C.;
   3) adding an aqueous solution of a ferrous salt to the mixed solution containing sodium silicate, and allowing to react at 40-60° C. for 2-3 hours; where, with decrease of the pH of the mixed solution, sodium silicate is converted into silica nanoparticles, and the ferrous salt reacts with the sulfide to form ferrous sulfide; and
   4) further adding an aqueous solution of an organic modifier to the mixed solution, and allowing to react at 40-60° C. for 1-2 hours to form a passivator slurry comprising surface-modified ferrous sulfide doped with silicon dioxide; filtering the passivator slurry through suction filtration to form a filter cake passivator or spray drying the passivator slurry to form a dry powdery passivator.

2. The method of claim 1, wherein in 1), the sulfide is sodium hydrosulfide, sodium sulfide, potassium sulfide, ammonium sulfide, or a mixture thereof.

3. The method of claim 1, wherein a molar ratio of the sulfide to the ferrous salt is between 0.85:1 and 1.00:1; sodium silicate is quantified by silicon dioxide, and a mass ratio of silicon dioxide to ferrous sulfide is between 1:1 and 1:2; and a molar ratio of the organic modifier to the ferrous salt is between 0.05:1 and 0.15:1.

4. The method of claim 2, wherein a molar ratio of the sulfide to the ferrous salt is between 0.85:1 and 1.00:1; sodium silicate is quantified by silicon dioxide, and a mass ratio of silicon dioxide to ferrous sulfide is between 1:1 and 1:2; and a molar ratio of the organic modifier to the ferrous salt is between 0.05:1 and 0.15:1.

5. The method of claim 3, wherein in 3), the ferrous salt is ferrous sulfate, ferrous chloride, or a mixture thereof.

6. The method of claim 4, wherein in 3), the ferrous salt is ferrous sulfate, ferrous chloride, or a mixture thereof.

7. The method of claim 1, wherein in 4), the organic modifier is at least one of sodium humate, potassium humate, and dialkyl dithiocarbamic acid comprising 1 to 10 carbon atoms or a salt thereof.

8. The method of claim 1, wherein in 1), the alkaline solution is a 1-5 mol/L aqueous solution of sodium hydroxide or potassium hydroxide.

9. A passivator for removing a heavy metal from soil prepared according to the method of claim 1, the passivator comprising surface-modified ferrous sulfide doped with silicon dioxide.

10. A method for improvement of heavy-metal-contaminated soil, the method comprising adding the passivator of claim 9 to the soil.

11. The method of claim 10, wherein the passivator accounts for 1-4 wt. % of the soil.

* * * * *